United States Patent
Lundstrom et al.

(10) Patent No.: US 6,701,220 B1
(45) Date of Patent: Mar. 2, 2004

(54) INDUSTRIAL ROBOT DEVICE

(75) Inventors: Christer Lundstrom, Enkoping (SE); Rafael Nissfolk, Vasteras (SE)

(73) Assignee: ABB AB, Vasteras (SE)

( * ) Notice: Subject to any disclaimer, the term of this patent is extended or adjusted under 35 U.S.C. 154(b) by 19 days.

(21) Appl. No.: 09/926,542

(22) PCT Filed: Jun. 20, 2000

(86) PCT No.: PCT/SE00/01303

§ 371 (c)(1),
(2), (4) Date: Dec. 26, 2001

(87) PCT Pub. No.: WO01/00369

PCT Pub. Date: Jan. 4, 2001

(30) Foreign Application Priority Data

Jun. 24, 1999 (SE) .............................. 9902408

(51) Int. Cl.$^7$ .............................. G06F 19/00
(52) U.S. Cl. ............. 700/245; 700/254; 418/9; 418/15; 418/87; 418/89; 418/97; 418/100; 418/85; 418/150; 418/201.3; 418/272; 318/562; 318/568.12; 901/23; 901/26; 901/29; 417/42; 62/408; 62/498; 74/490.02
(58) Field of Search ................. 700/245, 254; 418/85, 272, 100, 87, 89, 97, 201.3, 150, 9, 15; 417/42; 62/408, 498; 318/568.12, 562; 901/23, 26, 29; 74/490.02

(56) References Cited

U.S. PATENT DOCUMENTS

| | | | |
|---|---|---|---|
| 4,020,715 A | 5/1977 | Sollars | 74/606 R |
| 4,586,868 A | 5/1986 | Nakashima et al. | 414/735 |
| 4,671,732 A * | 6/1987 | Gorman | 318/568.12 |
| 4,695,027 A * | 9/1987 | Lindholm et al. | 700/900 |
| 4,787,262 A * | 11/1988 | Kozawa et al. | 901/23 |
| 4,804,304 A * | 2/1989 | Tellden | 901/26 |
| 5,036,724 A * | 8/1991 | Rosheim | 901/29 |
| 5,050,450 A * | 9/1991 | Nakamura | 700/259 |
| 5,178,032 A * | 1/1993 | Zona et al. | 901/29 |
| 5,330,241 A * | 7/1994 | Takahashi | 294/86.41 |
| 5,437,490 A * | 8/1995 | Mimura et al. | 294/106 |
| 6,091,219 A * | 7/2000 | Maruo et al. | 318/562 |
| 6,125,715 A * | 10/2000 | Nissfolk et al. | 74/490.02 |
| 6,389,921 B1 * | 5/2002 | Nada | 74/490.02 |

FOREIGN PATENT DOCUMENTS

| | | |
|---|---|---|
| EP | 0322670 | 7/1989 |
| EP | 0338673 | 10/1989 |

OTHER PUBLICATIONS

Falk Corporation, RAM Mixer Drives, 1996, 2002, Internet, pp. 1–6 + 1.*
D. R. Wulfinghoff, Reference Note 32, Compressor Cooling, 1999, Internet, pp. 1–23.*

* cited by examiner

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

An industrial robot including a manipulator having a control system. The manipulator includes a common gear housing having first and second inner compartments connected with a passage channel. First and second gears are arranged in the first and second inner compartments and are adapted to move the manipulator. A cooling and lubricant medium is disposed in the common gear housing and circulates between the first and second inner compartments through the passage channel.

5 Claims, 2 Drawing Sheets

INDUSTRIAL ROBOT DEVICE

TECHNICAL FIELD

The present invention relates to a gearbox configuration of an industrial robot.

PRIOR ART

In an industrial robots with six axes, which have a vertically articulated arm mounted on a stand, the driving means of the arm are placed near the centre of rotation of the arm. The remaining three driving means are arranged closer to the working tool of the robot. The aim is inter alia to give the industrial robot a compact construction and to contribute to keeping the weight of the arm low. Accordingly, the three driving means are arranged in the lower part of the robot towards the stand and generally comprise electrical motors. Each motor drives one shaft each for driving of the different degrees of freedom of the robot through gear and transmission. The gear generally comprises a toothed transmission gear enclosed in a gear housing filled with cooling and lubricant medium, which usually consist of oil.

The patent document U.S. Pat. No. 4,671,732 discloses an industrial robot with six axes having three driving means 21, 22 and 23 arranged in the lower part of the robot near the stand. The three driving means are identical, which simplifies the design and possible repair of the robot. The three driving units are completely separated from each other regarding accommodation for lubricant. The robot is designed to tolerate high requirements for accuracy despite wear of the parts included.

In operation the industrial robot is generally part of a production line, which can include e. g. a press. The robot supplies the press with moulding blanks that come to the robot over some type of conveyor.

The technical development aims at faster presses and also faster conveyors. This has entailed that the speed of the robot has had to increase concurrently with the development. The speed of driving and translation has increased approximately fivefold in the last fifteen years. This has led to that the enclosed toothed transmission gears under high bearing pressure must be driven with ever higher velocity, which requires increasing effect supply and gives increasing generation of heat in the gears, which increases the friction heat on the teeth.

For the purpose of absorbing and disposing heat from the teeth a cooling and lubricant medium encloses the gear. Problems arise when the driving and translation speed of the robot and the heat generation are so high that the cooling medium cannot cool the gear. Then, the flanks of the gear run the risk of being damaged from the high temperature. Thus, too high temperatures drastically decrease the lifetime of the gear. The risk of frequent shut downs and expensive repairs of the robot increases.

The three lower driving units in the robot are not driven equally and the corresponding gears are heated unequally. This results in an uneven distribution of the generated heat, which leads to different local thermal expansions in the material/metal of the robot, which in turn leads to deformities in the construction of the robot. The accuracy of the robot is decreased and the robot cannot fulfil the requirements called for by the user of the robot.

Another problem that arises at high temperatures is that the accuracy of the work of the robot is increased. In a robot with six axes the driving unit, which drives the rotational movement of the robot around a vertical and its gear, is charged the most and must be driven at very high speed. There, the temperature becomes very high and causes temperature differences to occur in different parts of the cooling and lubricant medium in the gearbox of the motor. This entails in turn means that the turn plate around which the robot is constructed and which secures the rotation around the vertical axis is heated unevenly, which has a negative influence on the accuracy.

Traditionally the above problems are solved through arranging cooling flanges on the outside of the gearboxes. Even an external cooler e. g. a cooling fan can help to decrease the temperature. All such solutions are bulky and insufficient and they are not suitable for an industrial robot, which is part of a production line.

Another problem is that three completely separated gearboxes require filling and discharge of cooling and lubricant medium and also aeration in three different places. This takes time, is dirty to handle and leads to unwanted or unnecessarily long shutdowns.

In production of industrial robots the need arises for a robot which can make fast speed with maintained accuracy. Furthermore, it should be easy to give the robot the necessary operation service.

The robot in the cited American patent document cannot fulfil this need.

SUMMARY OF THE INVENTION

In producing industrial robots a manipulator is equipped with i.e. control system and also motor driven gears and optional appurtenant transmissions. The development of robots has the aim of creating a faster robot, which corresponds to the possibilities of the surrounding equipment and the requirements of the customer. The aim is also to simplify and shorten the time for operative service of the robot.

Accordingly, the object of the present invention is to achieve an industrial robot including at least two motor driven gears, where the gears are arranged so that the requirement of sufficient cooling is fulfilled at the same time as the robot reaches provided requirements of accuracy and the time for service decreases.

The solution according to the invention is an industrial robot comprising at least two motor driven gear units, where the gear units have a common gear housing with common cooling and lubricant medium.

A gear box requires an opening for filling and a separate opening for discharging cooling and lubricant medium and also magnetic stoppers to keep the medium, e. g. the oil, free from wear particles. During operation an overpressure occurs in the gear unit e. g. because of heat expansion of the cooling and lubricant medium and therefore the gearbox often is provided with a type of breathing stopper.

It is also included in the scope of invention to design the gear housing with only one opening for common filling of lubricant oil and moreover only one discharge place for the oil. Aeration also can occur jointly through one or several aerating openings.

DESCRIPTION OF THE DRAWING

The invention will be explained in greater detail by describing an example of an embodiment with reference to the enclosed drawing, where.

DESCRIPTION OF EMBODIMENTS

Figure 1:
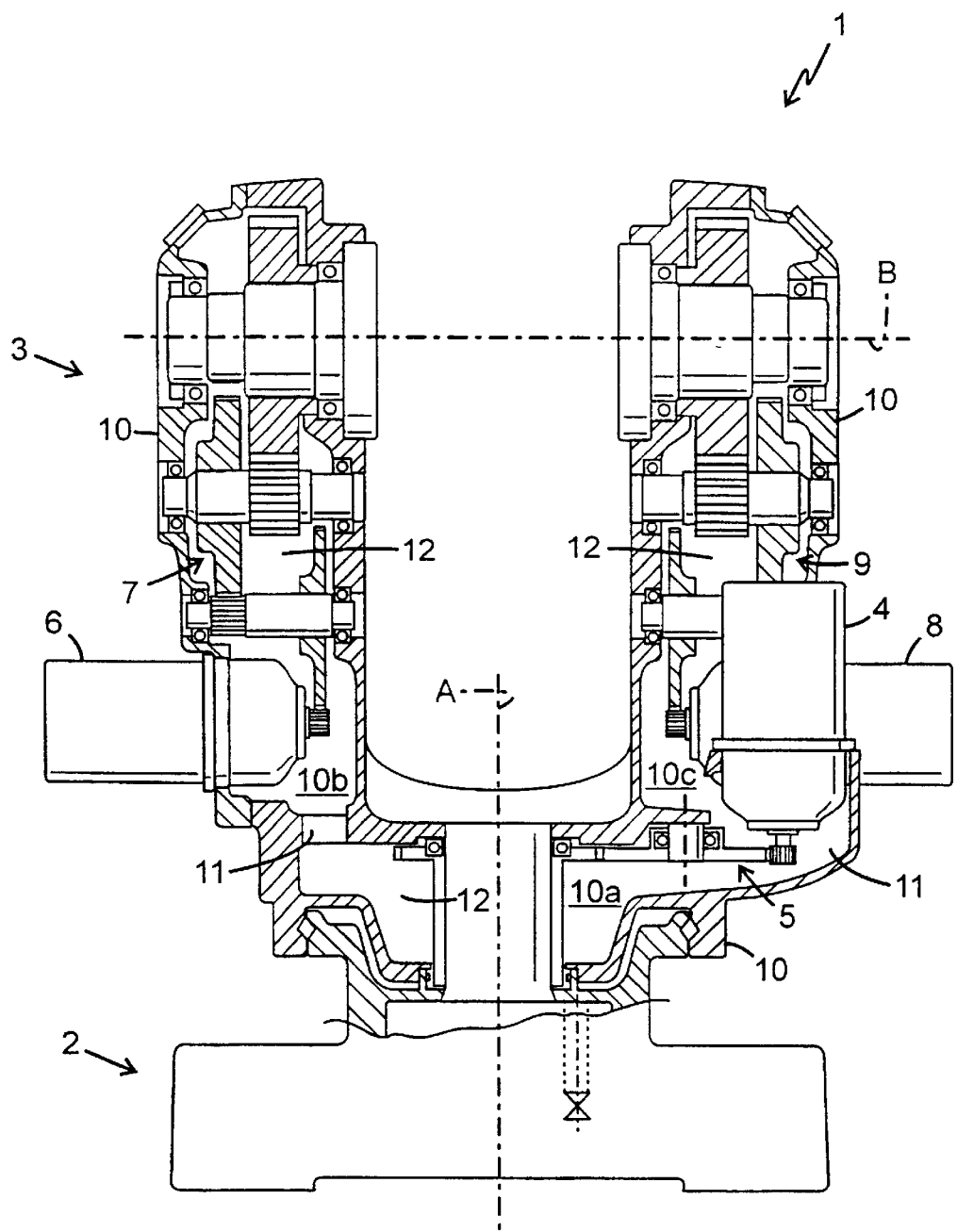
FIG. 1 shows a gearbox configuration arranged in an industrial robot in accordance with the present invention.
Figure 2:
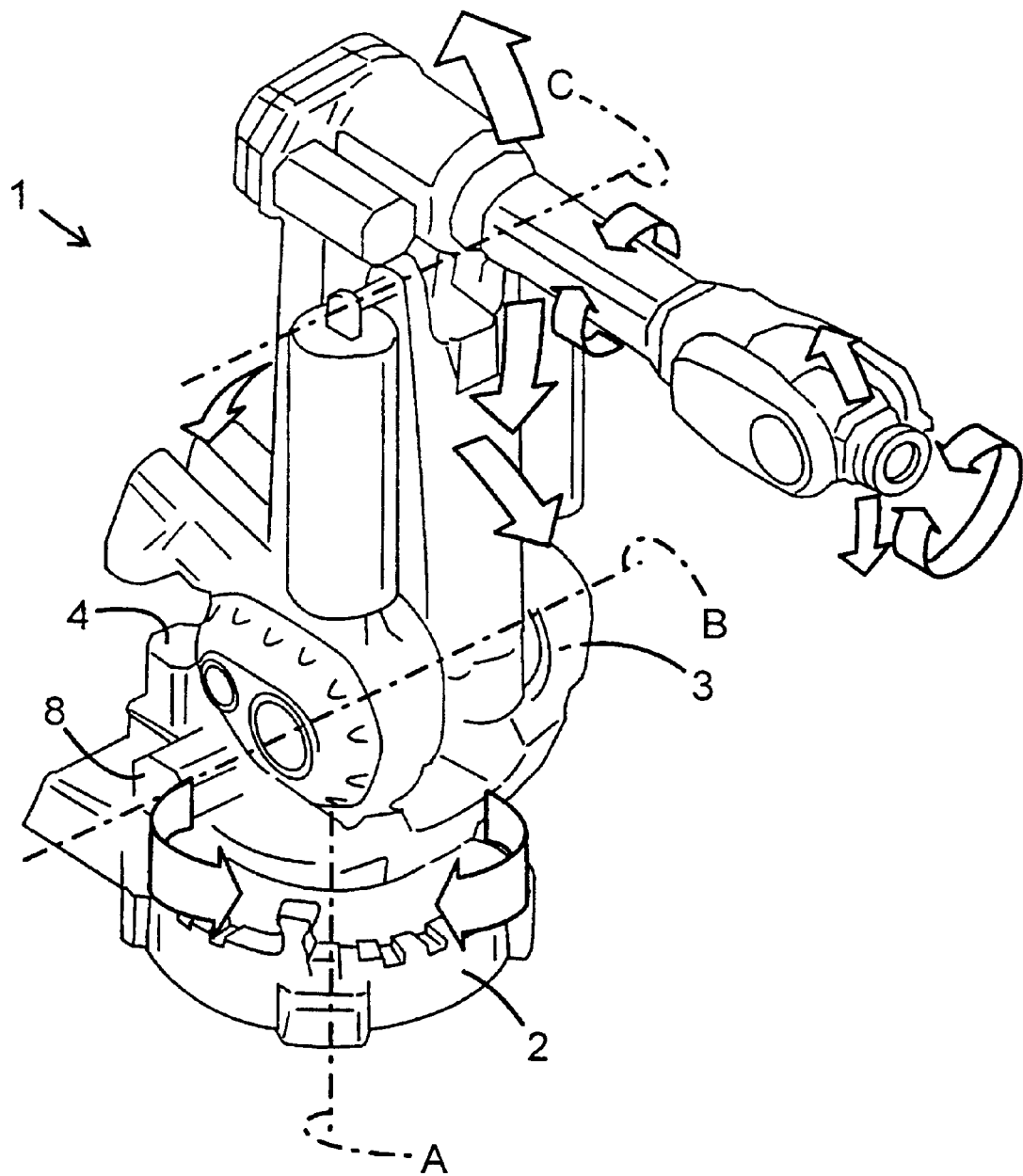
FIG. 2 shows an industrial robot with six axes arranged with three driving units in the lower part of the robot.

In an industrial robot comprising a manipulator with a control system (FIG. 2) electrically driven gears are arranged in the lower part of the robot at the stand to give the movements of the robot arm. Each electrical motor transmits rotational movements to a toothed transmission gear, which usually drives a transmission that transmits movements to the robot arm. In FIG. 2, a six axes industrial robot 1 with a stand 2 is shown, and also the thereon rotationally mounted robot foot 3. A first driving unit 4 (FIG. 1) is arranged to rotate the robot around the vertical axis A through a first toothed transmission gear 5. A second driving unit 6 is arranged to rotate the robot arm around a horizontal axis B through a second toothed gear transmission 7. A third driving unit 8 is arranged to rotate the robot arm around the horizontal axis C through a third toothed transmission gear 9. The first 5, second 7 and third gear 9 are arranged in a common gear housing 10. The gear housing 10 is cast in one piece, and because of technical reasons of design and strength the housing is subdivided into several inner compartments 10a, 10b and 10c, which are connected with passage channels 11. The gear housing 10 is filled with cooling and lubricant medium 12, which surrounds the gears 5, 7 and 9.

During operation of the robot the first, second and third motor and their gears are working in different degrees to make the robot perform the desired movements. Through driving of the different gears, the surrounding cooling and lubricant medium 12 is caused to circulate. The cooling and lubricant medium absorbs heat from the teeth and through the circulation in the common gear housing and any temperature differences in the medium 12 are levelled out, and a uniform temperature is obtained in the whole housing.

Alternative Embodiments

To facilitate/speed up the circulation of the agent 12, an external device 13 can be connected to the gear housing viz. a pump.

What is claimed is:

1. An industrial robot comprising:
   a manipulator including a control system, the manipulator comprising:
      a common gear housing including first and second inner compartments connected with a passage channel, first and second gears arranged in the common gear housing configured to move the manipulator, and a cooling and lubricant medium disposed in the common gear housing and circulating between the first and second inner compartments through the passage channel.

2. The industrial robot according to claim 1, further comprising:
   an external device configured to increase a speed of circulation of the cooling and lubricant medium.

3. The industrial robot according to claim 2, wherein the external device comprises a pump.

4. A method of cooling and lubricating an industrial robot including a manipulator having a control system and first and second gears arranged in first and second inner compartments of a common gear housing, said method comprising the step of:
   circulating a cooling and lubricating medium between the first and second inner compartments through a passage channel connecting the inner compartments.

5. The method according to claim 4, wherein the circulating step comprises circulating with a pump.

* * * * *

UNITED STATES PATENT AND TRADEMARK OFFICE
CERTIFICATE OF CORRECTION

PATENT NO. : 6,701,220 B1
DATED : March 2, 2004
INVENTOR(S) : Christer Lundstrom et al.

It is certified that error appears in the above-identified patent and that said Letters Patent is hereby corrected as shown below:

Column 2,
Line 6, delete "entails"
Line 30, change "i.e. control system" to -- e.g. a control system --.

Column 3,
Line 9, change "a six axes industrial" to -- a six-axis industrial --.
Line 18, change "gear 9 are arrangerd in a" to -- gears 9 are arranged in a --.

Signed and Sealed this

Nineteenth Day of October, 2004

JON W. DUDAS
*Director of the United States Patent and Trademark Office*